United States Patent
Longman et al.

(10) Patent No.: US 7,650,142 B2
(45) Date of Patent: Jan. 19, 2010

(54) METHOD FOR SETTING UP A CONFERENCE CALL

(75) Inventors: Timothy Longman, London (GB);
Martin Sauter, Markdorf (DE);
Frederic Carrier, Allen, TX (US);
Thomas Altwein, Immenstaad (DE);
Darin Currie, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 15 days.

(21) Appl. No.: 10/887,263

(22) Filed: Jul. 8, 2004

(65) Prior Publication Data
US 2006/0008065 A1    Jan. 12, 2006

(51) Int. Cl.
*H04M 3/42* (2006.01)

(52) U.S. Cl. .................. 455/416; 455/519; 379/158; 379/202.01

(58) Field of Classification Search ............... 455/416, 455/518–521, 426.1, 553.1, 512; 379/93.21, 379/202.1, 158; 370/261, 260, 266; 709/204; 715/153, 753; 348/14.09; 340/7.46, 10.32
See application file for complete search history.

(56) References Cited

U.S. PATENT DOCUMENTS

| | | | | |
|---|---|---|---|---|
| 4,682,367 A | * | 7/1987 | Childress et al. | 455/17 |
| 5,473,605 A | * | 12/1995 | Grube et al. | 370/261 |
| 5,495,522 A | * | 2/1996 | Allen et al. | 379/202.01 |
| 5,537,684 A | * | 7/1996 | Cassidy et al. | 455/512 |
| 5,574,934 A | * | 11/1996 | Mirashrafi et al. | 709/207 |
| 5,930,723 A | * | 7/1999 | Heiskari et al. | 455/518 |
| 5,970,417 A | * | 10/1999 | Toyryla et al. | 455/519 |
| 6,026,295 A | * | 2/2000 | Okada | 455/416 |
| 6,163,692 A | * | 12/2000 | Chakrabarti et al. | 455/416 |
| 6,208,872 B1 | * | 3/2001 | Schmidt | 455/518 |
| 6,253,091 B1 | * | 6/2001 | Naddell et al. | 455/519 |
| 6,292,670 B1 | | 9/2001 | Kauria et al. | |
| 6,308,079 B1 | * | 10/2001 | Pan et al. | 455/519 |
| 6,405,050 B1 | * | 6/2002 | Amirijoo et al. | 455/518 |
| 6,445,687 B1 | | 9/2002 | Mikami | |

(Continued)

FOREIGN PATENT DOCUMENTS

WO    WO 01/31964    5/2001

OTHER PUBLICATIONS

"Digital cellular telecommunications system (Phase 2+); Universal Mobile Telecommunications Systems (UMTS); Enhanced Multi-Level Precedence and Preemption Service (EMLPP); Stage 2 (3GPP TS 23.067 version 5.0.0 Release 5; ETSI TS 123 067".

*Primary Examiner*—Sharad Rampuria
(74) *Attorney, Agent, or Firm*—Barnes & Thornburg LLP

(57) ABSTRACT

A method for setting up a conference call where the subscribers are not only concentrated in one area but also more widely dispersed. The method allows both groups of subscribers to be contacted for a conference call with individuals close to the point of origination of the conference call being connected to a shared channel call and any members further out being connected to the conference call using individual channels. Members who initially started with an individual channel can move closer to the point of origin and automatically join the shared channel. This is of particular use to the emergency services where they may need to co-ordinate members arriving at the scene or performing related actions further away from the scene of the emergency.

13 Claims, 3 Drawing Sheets

U.S. PATENT DOCUMENTS

| | | | |
|---|---|---|---|
| 6,477,366 B1 * | 11/2002 | Valentine et al. | 455/416 |
| 6,539,219 B1 * | 3/2003 | Gallant et al. | 455/416 |
| 6,564,049 B1 * | 5/2003 | Dailey | 455/416 |
| 6,564,066 B1 * | 5/2003 | Biggs et al. | 455/512 |
| 6,577,848 B1 * | 6/2003 | Gregg et al. | 455/13.2 |
| 6,603,965 B1 * | 8/2003 | Dinkin | 455/416 |
| 6,690,933 B1 * | 2/2004 | Chapman et al. | 455/414.1 |
| 6,714,795 B1 * | 3/2004 | Long et al. | 455/518 |
| 6,993,355 B1 * | 1/2006 | Pershan | 455/518 |
| 7,155,248 B2 * | 12/2006 | Idnani | 455/519 |
| 7,209,947 B1 * | 4/2007 | Lee et al. | 709/204 |
| 7,277,697 B2 * | 10/2007 | Desai et al. | 455/416 |
| 7,317,919 B1 * | 1/2008 | Ruf | 455/446 |
| 2002/0037723 A1 * | 3/2002 | Roach | 455/435 |
| 2002/0061762 A1 * | 5/2002 | Maggenti et al. | 455/519 |
| 2003/0016632 A1 * | 1/2003 | Refai et al. | 370/260 |
| 2003/0092433 A1 * | 5/2003 | Flannery | 455/416 |
| 2004/0015550 A1 * | 1/2004 | Nakamura | 709/204 |
| 2004/0082352 A1 * | 4/2004 | Keating et al. | 455/519 |
| 2004/0198357 A1 * | 10/2004 | Plyle et al. | 455/435.3 |
| 2004/0259581 A1 * | 12/2004 | Crisler et al. | 455/519 |

* cited by examiner

METHOD FOR SETTING UP A CONFERENCE CALL

This invention relates to a method of setting up a conference call to a pre-determined group of subscribers. The determination of the subscribers is a combination of geographic location, subscription and list membership. The invention is applicable to use within telecommunications systems used by Emergency Services such as the police force.

BACKGROUND TO THE INVENTION

Conference calls are used in many situations nowadays. They are of particular use to groups of people who need to reach a decision rapidly but cannot talk face to face. By using a conference call a single number may be dialed to set up a conference call. This negates the need to make multiple individual calls or even connect multiple parties on an individual basis to a conference call. In the emergency services this can prove especially important where informed decisions need to be made rapidly.

There are presently three main ways of setting up a conference call in a Global System for Mobile Communication (GSM) or General Packet Radio Service (GPRS) network. Firstly, a call may be set up such that each user connects to the call using a respective channel on the network; a so called "Multiparty Bridge" call. The use of one channel per user rapidly uses up bandwidth meaning that only a limited number of users within a certain area can participate in the group call using this type of conference call technique. However, this type of multi-party call is highly efficient when contacting users who are distributed over a large geographic area and who are therefore served by many different base stations.

The second method for setting up a conference call involves defining an area over which the call is to be available and providing only one channel for that call in each cell within that area. This may be provided in cells which use GSM Phase 2+ with Advanced Speech Call Items (ASCI). Any users in a cell within the predefined area and subscribed to be part of the conference call can connect to the channel and take part in the conference call. However, any subscribed users not within one of the cells contained by the predefined area cannot take part in the call as they have no channel allocated to allow them to take part in the conference call. Additionally, there is a significant cost associated with upgrading many handsets, base stations and the provider infrastructure to the GSM Phase 2+ standard to provide the ASCI capability. Hence, there is the possibility that people who need to be included in the conference call are not. Nevertheless, this is an efficient way of providing a conference call if there are a large number of users within a small geographical area.

The final method for setting up a conference call is known as Push-to-talk (PTT). This method uses a packet switched network and, as with the multi-party bridge call set up, one channel is allocated to each user resulting in the same drawbacks. However, there are additional disadvantages to this method of conference calling in that, at present, the system is not considered robust enough to be relied on for emergency service calls and requires further development.

For the Emergency Services a typical scenario could be that, at the beginning of an emergency situation, members of the Emergency Services are widely dispersed. Then, as the emergency progresses, more members are likely to converge on a single area. There is currently no efficient method for providing a multiparty call to people involved in a scenario such as this.

SUMMARY OF THE INVENTION

The first aspect of the present invention combines a method of setting up a conference call using both a geographically based subscription service where only service users present within a pre-defined area are contacted and a user based subscription service where all the service's users are contacted regardless of their geographical position. It achieves this by setting up a shared channel conference call with all subscribers present in cells having the shared channel conference call being able to connect to the conference call and an individual channel conference call to any users in any other cells.

This provides the advantage that bandwidth is conserved during a time and place when it is at a premium but that additionally all callers that should be part of the conference call are contacted when the call is set up.

This may be achieved by providing a list of subscribers to the conference call provider. Individual connections to all of these subscribers using a lower call priority than the priority of the shared channel conference call are made when a conference call is initiated. In this way any users within the coverage of the shared channel conference call connect to the shared channel conference call at a certain priority whereas any users outside the coverage of the shared channel conference call are connected to the conference call through individual channels on a lower priority.

In a further aspect of this invention the list of subscribers is monitored and handsets are only contacted if they are active. This may be done according to the time of the call or, alternatively, the handset location at the time of the call. Included in the list of subscribers therefore may be times between which the handset is "active", for example these may correlate to the times when a police officer is on-duty.

Also included in the list may be a location register which keeps track of the locations of the handsets and will not include the handsets in a group call if they are outside a certain pre-defined area. This area is larger, preferably significantly larger, than the pre-defined area described above for the shared channel conference call and specifies the area within which individual channel calls are to be made to the handset. This may be for example a metropolitan area such as a city, whereas the shared conference area may only cover a neighborhood.

This provides the advantage that unnecessary connections are prevented from being made. For example, if a person is out of the area then they will not be part of the conference call as they are unable to provide assistance for that emergency.

Other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

Figure 1:
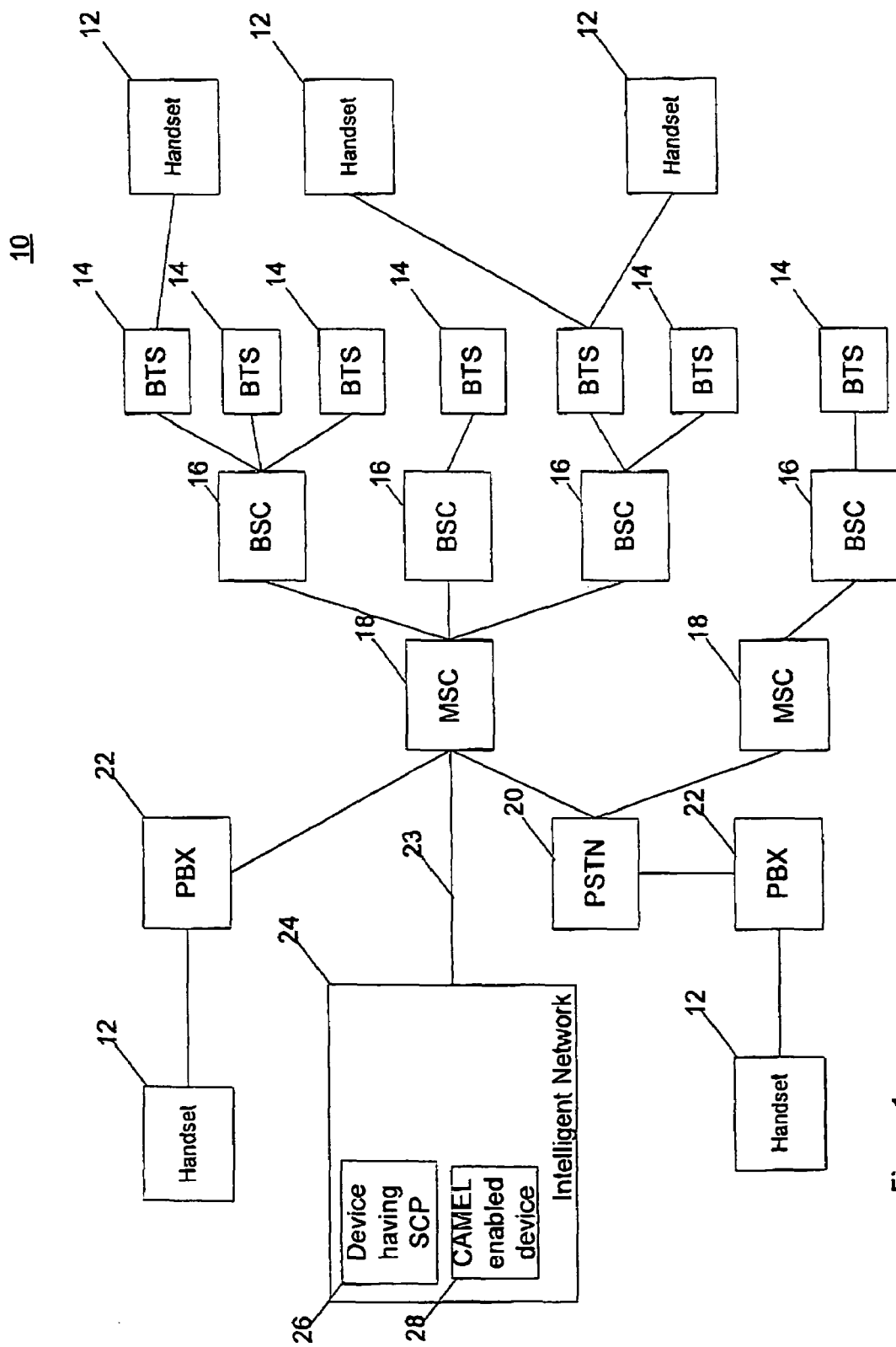
FIG. 1 illustrates a communications network.

Traditionally, in the event of an emergency a police officer near the incident will notify a call centre of the emergency. The call centre is in contact with all police officers who are on duty in a particular region and acts to coordinate the response of any police officers who are available to help with the emergency.

A good way to contact all available police officers is to set up a conference call so that when a large incident occurs the police officer nearest the scene, or the control centre, whoever is notified first, can quickly communicate with all available police officers. This allows a fast and co-ordinated response to the emergency to be effected. However, in the early stages of a response to an emergency it is likely that the police officers who will respond to the call are widely dispersed i.e. there will be a low density of police officers. The larger the emergency the larger the number of police officers who will be required to attend the scene of the incident and therefore, the more widely dispersed the police officers are likely to be.

In this situation, i.e. on initiation of an "emergency call", the most efficient way to set up a conference call between police officers who are to respond to the emergency is to set up a conference call using multiparty bridges. In this case each police officer has an individual channel connection made to their handsets.

However, as the emergency situation develops and more officers respond it is likely that a large number of police officers will converge on a single focal point i.e. there will be a high density of police officers within a single area. If all the police officers within that area are connected to the conference call using a multiparty bridge then it is likely that the bandwidth in the area of the emergency will become highly congested. This congestion could result in police officers being dropped from the conference call or any extra calls which need to be made not getting a channel for their connection. Either of these situations will hamper the response of the Emergency Services to a large scale emergency. In this situation a GSM Phase 2+/ASCI call where the police officers connect to a single channel provided over a defined area is the most efficient way of connecting the police officers.

Ideally, therefore, any conference call that is initiated to control an emergency situation will be flexible enough to provide an efficient connection to a combination of widely dispersed and highly concentrated distributions of users. The present invention alters the set-up of a GSM Phase 2+/ASCI call so that a conference call having a combination of the features of a multiparty bridge conference call and a GSM Phase 2+/ASCI call is provided. This enables a more efficient connection of multiple users to a conference call than is the case using the traditional methods of setting up a conference call.

Every user who subscribes to be part of a conference call that uses GSM Phase 2+/ASCI features must be provided with an ASCI enabled handset which allows them to communicate in an ASCI call with other users. Each conference is allocated a Group ID. The Group ID allows identification of the appropriate call set up for the conference call as well as identification of members who should be included in a call having a particular Group ID. Different conferences have different Group IDs and different set-ups.

Any handset belonging to a user subscribed to be part of a conference call is programmed such that it can connect to the conference call when such a call is made. A user subscribed to the conference call has the Group ID for the conference call programmed onto the Subscriber Identification Module (SIM) card belonging to a handset. SIM cards contain the profile of a user, for example their Phone number, call barring and also include the Group IDs of any conference calls the user is subscribed to. The user's profile may be altered by programming and, therefore, a SIM card may be programmed to allow a user to participate in a conference call set up with a Group ID identified in the profile.

Additionally, any handset programmed to take part in the call may initiate a conference call by dialing the Group ID and, therefore, the conference call. The conference call that is set up using an ASCI call will have access to the ASCI feature set consisting of: Voice Broadcast Service (VBS), Voice Group Call Service (VGCS) and, for this invention, enhanced Multi-Level Precedence and Pre-emption service (eMLPP).

FIG. 1 illustrates a communications network 10 in which the invention may be carried out. When an Group ID code is dialed from a GSM Phase 2+ enabled handset 12 a request to set up a GSM Phase 2+/ASCI call is sent from the initiating handset 12 to a Mobile Switching Centre (MSC) 18 network device via a Base Transceiver Station (BTS) 14 and Base Station Controller (BSC) 16. The request for connection prompts the network device to call up a Call Conference List 30 which is associated with the Group ID code, that has been dialed. The Conference Call List 30 is preferably stored on the network device.

The Conference Call List 30 called up by the network device comprises a Group Call (GC) Area code and the Group ID, together referred to as the GC Reference, the priority of the call and a list of controller numbers. However, a link 34 to a Subscriber List 32 is also included in the Conference Call List 30. It is this link 34 which enables the system to set up individual connections to users who are subscribed to the conference call as described in greater detail below.

The area specified in the GC Area code is preferably predefined in the Conference Call list 30. The Conference Call List 30 may specify an area over which the shared channel call must be set up on initiation of a conference call having a particular Group ID. The geographical area covered by the shared channel call may be varied according to the location of the initiating handset 12 when initiating the call.

The priority of a call is used to determine the importance of a call in relation to any other calls which are in progress or initiated during the call. For example, if a conference call is initiated using an emergency code then the conference call is allocated the highest priority allowed by the system. The interaction between calls of different priorities is discussed in more detail below.

Controllers numbers may be used to connect to people who are essential to the co-ordination of a response. These people may be high up in the organisation or, alternatively, situated at a control centre coordinating the response to an emergency.

During the initiation of a GSM Phase 2+/ASCI call individual connections to handsets 12 or fixed terminals in a control centre having a controller number included in the Conference Call List 30 are set up using individual channels. This ensures that all the people allocated controller numbers are contacted and participate in the conference call regardless of the time of the call or the controller's location. The individual channel connection may be either through the communications network 10 to other handsets, through another network such as the PSTN 20 or via a Private Branch Exchange (PBX) 22.

Figure 3:
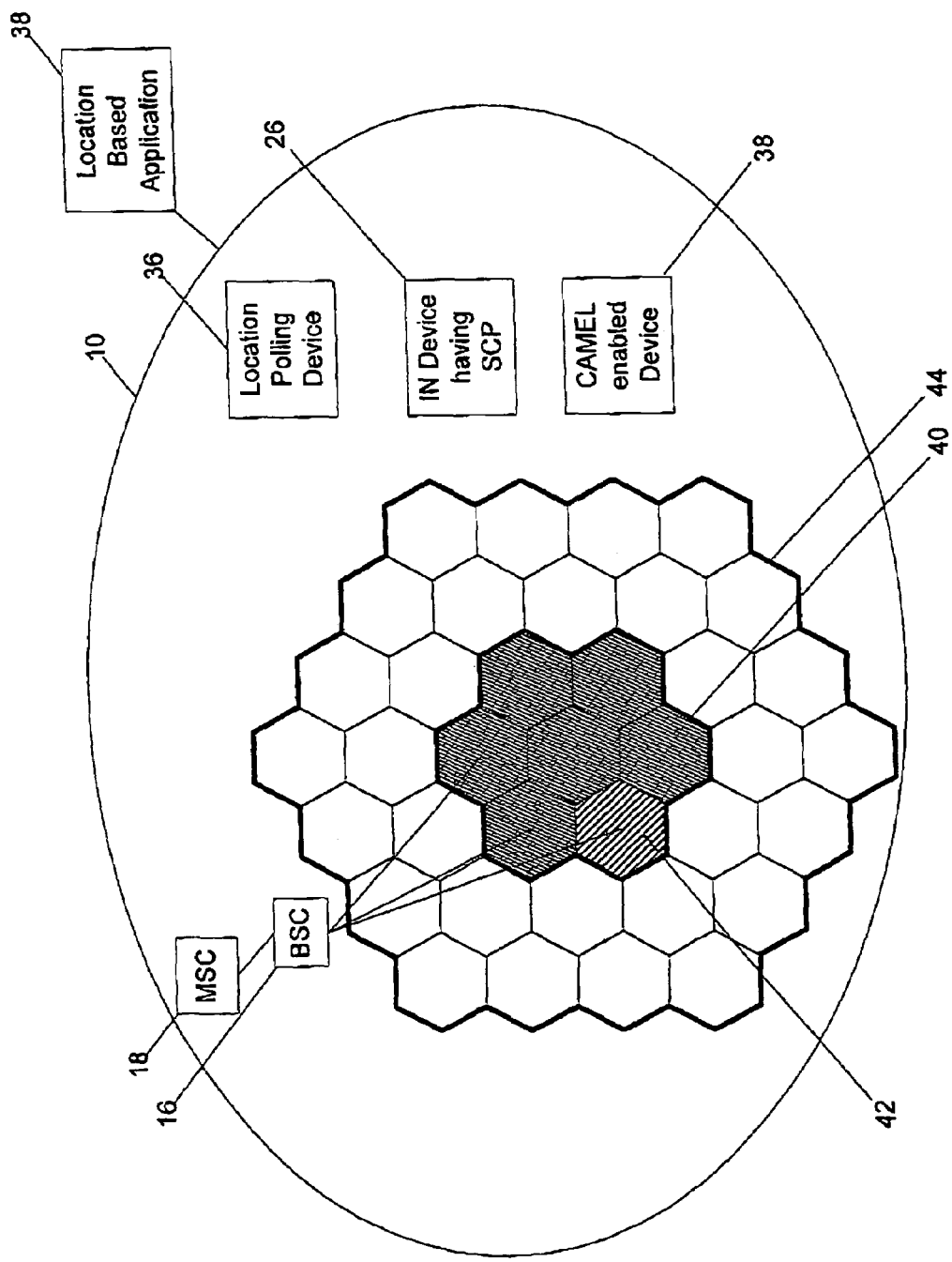
FIG. 3 illustrates diagrammatically the arrangement of a conference call over an area.

Once a network device is notified of a request to set up a conference call, it proceeds to set up a shared channel to support a GSM Phase 2+/ASCI call having the properties shown in FIG. 3, in the area 40 specified in the GC Area code. Any users having handsets 12 with a user profile including the Group ID for this specific conference call are connected to the shared channel dedicated to the conference call. Users who have subscribed to the conference call and are in the GC area 40 in which the shared channel has been set up can hear any communications across the shared channel. Preferably, the shared channel is a temporary half-duplex connection and, therefore, allows all users within the GC area 40 to speak to each other in turn using the shared channel.

If a cell 42 in the GC area 40 defined for the conference call does not have a user handset 12 having a user profile with the Group ID specified for the conference call within it then the system can preserve air-interface bandwidth by not providing an air interface. This can be done by preventing a BTS 14 signalling to a cell 42 having no appropriately programmed handset 12 within it. The absence of a handset 12 within a cell 42 is recognised by a BSC 16 when it is setting up a shared channel in a cell controlled by a BTS 14 managed by the BSC 16. This is because the BSC 16 will not receive a response to any notification message it sends out on setting up a shared channel within the cell 42. It should be noted that the shared channel connection within the cell 42 must be maintained in order to allow any handset moving into the cell to connect to the conference call using a shared channel connection and it is only the air interface which is not set up. A handset hand-off to the BTS 14 signalling within a cell 42 which does not have an air interface for the conference call set up initiates the setting up of an air interface. This means that any handset 12 moving into that cell 42 may maintain its connection to the conference call using the shared channel.

The setting up of a conventional GSM Phase 2+/ASCI call means that any users subscribed to the conference call not in the GC Area 40 will not be connected to the conference call. Hence, if only a GSM Phase 2+/ASCI call is set up in the initial stages of a response to an emergency a significant number of police officers may not receive any orders broadcast across the conference call. In order to include any users outside the GC area 40, not specified as controllers in the conference call an extra link 34 to a Subscriber List 32 is included in the Conference Call List 30.

Figure 2A:
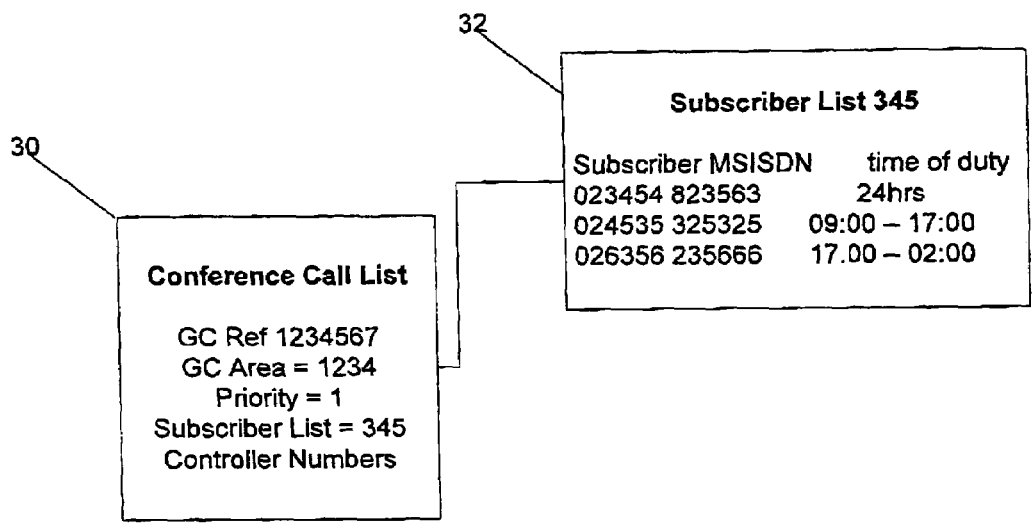
FIGS. 2a and 2b illustrates subscriber lists.
Figure 2B:
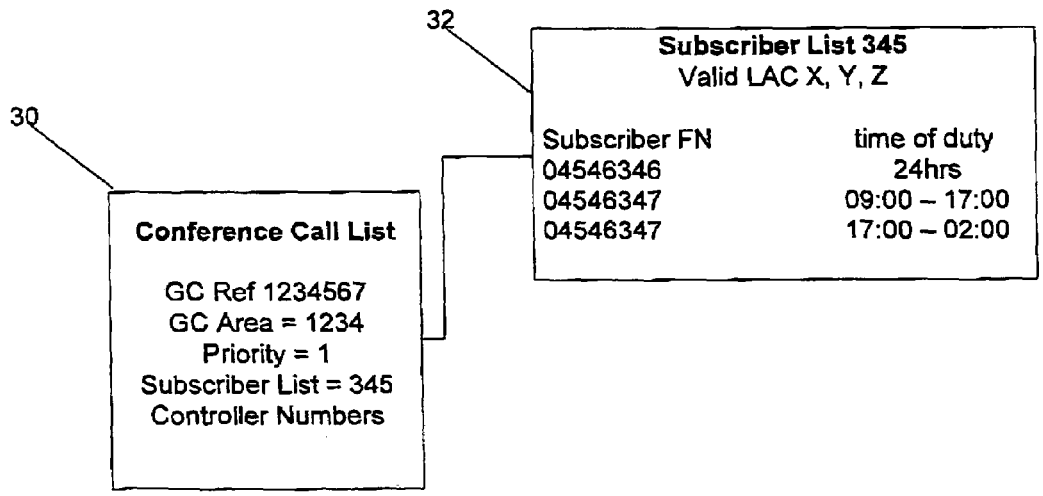

With reference to FIGS. 2a and 2b, the Subscriber List 32 contains the numbers of all the users who are subscribed to take part in a given conference call i.e. users who have the Group ID for the conference call programmed onto SIM card on their handsets. The Subscriber List 32 is called up by the network device when it is setting up the GSM Phase 2+/ASCI using the Conference Call List 30.

The Subscriber List 32 may be stored on the network device, with the Conference Call List 30. Alternatively, the Subscriber List 32 may be contained on a third party provisioning device 26, such as a SCP, external to the network device and, preferably, having a signalling connection 23 to the network device. The third party provisioning device 26 may be contacted using a controller number specified in the Conference Call List 30, which triggers signalling to the third party provisioning system, and therefore, replace a controller handset. The third party provisioning device 26 is preferably an intelligent network (IN) device.

Once the network device has called up the Subscriber List 32 it acts to set up an individual channel connection to each handset 12 contained on that list 32. Hence every handset 12 subscribed to the conference call is connected to the conference call at least by an individual connection, regardless of the geographical location of the user. But at a lower priority than the associated ASCI conference call which has been simultaneously set-up.

The handset numbers contained in the Subscriber List 32 may be Mobile Station Integrated Services Digital Network (MSISDN) numbers. The MSISDN numbers are numbers which are specific to the SIM card and need to be dialed to reach a handset 12 having a particular SIM card. Alternatively, the numbers contained in the Subscriber List 32 may be functional numbers. A functional number is a number that, rather than being related to a specific handset 12, relates to the role of the user carrying a handset. The Subscriber List 32 may contain a mixture of MSISDN numbers and functional numbers as long as the device 26 can distinguish between the different types of numbers, for example by the number type being identified by a prefix to the number.

An example of a functional number could be for a police officer walking a certain route at a certain time. This route may be allocated a functional number, such that any handset 12 taken on that route on any day is registered with the communications system in such a way that it answers any calls made to the functional number. In this way any police officer taking that route may be contacted using the same number. The use of a functional number can reduce the management burden of maintaining an up to date Subscriber List 32 as the number for a job stays the same regardless of the handset being used.

As discussed previously, the Subscriber List 32 may be held on an IN device 26. In this embodiment, the IN device 26 is contacted by the network device when a request to set up a conference call is received. The Service Control Point (SCP) (not shown) of the IN device 26 can be set up to manage a list of all numbers for subscribers to be contacted for a conference call having a particular Group Call Reference. The status of the subscriber numbers can be updated according to whether the functional numbers are registered as being active, or not, on the SCP, by checking the status of the functional numbers which are managed on the SCP.

In order to prevent a handset 12 from being connected to a conference call through both a shared channel and an individual channel, shared and individual channel calls are allocated different priorities.

The call priority of the shared channel call set up in the area is specified in the Conference Call List 30 allocated to the conference call's Group Call Reference. In the current example, the number dialed references a conference call list and Group ID for an emergency; hence the Conference Call List 30 for the Group ID specifies the highest possible priority for the shared channel call. By having the highest priority value, in this case 1, the conference call initiated in response to an emergency situation will have precedence over any new or existing calls having a lower priority. This means that this call will be connected to the handset 12, any existing calls will be disconnected and no other calls will be able to interrupt the conference call. This is important in an emergency when instructions and orders must be received and acted on promptly. If no call priority is specified for a call to the handset 12 then the call priority takes a default value specified in the system.

Calls to all individual subscriber numbers contained within the Subscribers List 32 are set up using individual channels as previously described. However, calls set up using this method are allocated a priority below that of the shared channel call set up in the GC Area 40. This means that any handsets 12 in cells within the GC area 40 specified in the Conference Call List 30 will be connected to the shared channel call in preference to the individual channel call which is also set up. Any handsets 12 in cells outside of the GC area 40 are unable to access the shared channel call and are therefore connected to the conference call using individual channels.

Preferably, the priority of individual channel calls set up using the numbers contained in the Subscriber List 32 is only one priority lower than that of the shared channel call. This is so that only the shared channel call has precedence over the individual channel connection meaning that the individual channel call will only be disconnected if the handset 12 is able to connect to the shared channel call for that conference call and no other calls will interrupt the connection.

Referring back to the emergency situation described above and FIG. 3. A police officer may move from being outside the GC area 40 at the beginning of the conference call to being inside the GC area 40 later on in the conference call. On moving into the GC area 40 the officer's handset 12 is informed of the presence of the higher priority shared channel call.

The handset 12 receives a request to join the shared channel call and, as the shared channel call has a higher priority than the individual channel call, the handset will automatically connect to the shared channel call. The lower priority individual channel call connection will then be terminated. In this way a handset 12 automatically switches to connect to the shared channel call when the handset moves into the GC area 40 because of the difference in priorities of the calls.

It may be helpful to a user to know whether they are within the GC area 40 or not. For this reason the Group Call Reference of a call may be displayed on the handset 12 of any user receiving a call.

Preferably the setting of call priorities and control of the automatic change in connection between the individual connection and shared connection is carried out using the ASCI feature of enhanced Multi-Level Precedence and Pre-emption (eMLPP). This is a feature which users with ASCI enabled handsets 12 can subscribe to.

An additional problem posed to the Emergency Services is that all users who are subscribers to a conference call are contacted when a conference call is set up. However some of these users may be unable to respond to the call. This may be because they are not on duty or, alternatively, the user may be too far away. Including users in the conference call when they are unable to respond in the instance of an emergency results in a waste of bandwidth resources at a time when these resources are at a premium.

In order to counteract this problem the third party provisioning system employed to manage the Subscriber List 32 may take into account time and geographical restrictions when deciding who to include when setting up a conference call.

The SCP of the IN device 26, in addition to being able to manage the Subscriber List 32 through registrations of handsets with it, may also manage the Subscriber List 32 according to specified times at which the numbers contained in the Subscriber List 32 are specified as being active. This may be done by specifying the times, shown as a list in FIGS. 2a and 2b, at which a handset 12 may be included in the conference call. For example, a police officer may be on duty between 12 am and 12 pm. By entering this time restriction into the Subscriber List 32 the SCP can determine that the police officer should be included in a conference call initiated at 5 am but should not be included in an equivalent conference call initiated at 1 pm. In this way the Subscriber List 32 can take into account the time of the conference call when deciding who to include in the conference call when setting one up. Correspondingly by including time restrictions in the Subscriber List 32 the management burden for maintaining the list 32 is decreased.

With reference to FIG. 3, in order to regulate the Subscriber List 32 according to a user's location, information on a specified area 44 within which a handset 12 should be connected to a conference call is included in the Subscriber List 32. Preferably this information is stored in the form of a location area code (LAC) which uniquely identifies a group of cells covering an area 44 within a communications network 10. The LAC information contained within Subscriber List 32 can be utilised by another third party provisioning device 28. This may optionally be a CAMEL (Customised applications for Mobile Enhanced Logic) enabled device. The SCP may be the CAMEL enabled device.

CAMEL applications are defined by ETSI and 3GPP and may be stored on an intelligent network device 28. The network device 18 informs the third party provisioning device 28 about the current LAC of the handset 12 allowing the provisioning device the option of including them in the subscriber list when the conference call is set-up.

Optionally there is also a location polling device 36 such as a mobile location centre which can obtain estimates of the location of handsets 12 in the communications network 10 and a location-based application 38 which can receive information from the location polling device 36 and CAMEL enabled device 28 contained within the IN 24. The presence of the location polling device 36 and location-based application 38 enables controllers, such as the call centre, to monitor the location of any handsets 12 which are present within the LAC defined area 44. Having information on the location of users may help them co-ordinate a response to an emergency more effectively.

Using these extra features the third party provisioning system on the IN 24 can automatically determine which handsets 12 are "active" at the time of the call, for example, in the case of a police officer, whether the handset 12 belonged to a police officer who is both on duty and close enough to be able to respond to an emergency. If a handset 12 is not active then the IN devices 26 and 28 reject any request to contact the handset 12 and the handset 12 does not have any connection to the conference call set up.

The invention claimed is:

1. A method of setting up a conference call between subscriber mobile stations comprising the steps of:
   (a) a device initiating a shared channel within a defined area, the shared channel being a channel that a plurality of the subscriber mobile stations in the defined area use to connect to said conference call, the shared channel call having a first priority;
   (b) the device retrieving a subscriber mobile station number list; and
   (c) the device initiating an individual channel call to a member of the stored subscriber mobile station number list, the individual channel call using an individual channel to which an individual subscriber mobile station connects, to connect to said conference call, the individual channel call having a second priority which is lower than the first priority;
   such that when the conference call is initiated a subscriber mobile station for a subscriber within said defined area is connected to said conference call using said shared channel as the shared channel call has a higher priority than that of the individual channel call, and a subscriber mobile station outside said defined area is connected to said conference call using an individual channel.

2. A method of setting up a conference call according to claim 1 including connecting a subscriber to said shared channel and disconnecting said individual channel connection when said subscriber moves into said defined area.

3. A method of setting up a conference call according to claim 1 where the change from said individual channel connection to said shared channel group call occurs using enhanced Multi-Level Precedence and Pre-emption service.

4. A method of setting up a conference call according to claim 1 where said subscriber list includes a functional number.

5. A method of setting up a conference call according to claim 1 where a number in said subscriber list has a time period associated with it such that said number is only connected to said conference, call when said conference call is initiated during the time period associated with said number.

6. A method of setting up a conference call according to claim 1 where said subscriber list also includes a register detailing where a subscriber mobile station is located.

7. A method of setting up a conference call according to claim 6 where a number on said subscriber list is only connected to said conference call using an individual channel if a subscriber mobile station associated with said number is located within another defined area.

8. A method of setting up a conference call according to claim 6 where said register is maintained using a third party provisioning system.

9. A method of setting up a conference call according to claim 8 where said third party provisioning system includes a CAMEL enabled device.

10. A device in a communications network configurable to support a conference call between subscriber mobile stations comprising:
   (a) a first call set-up device to initiate set up of a shared channel conference call within a defined area, the shared channel being a channel that a plurality of the subscriber mobile stations in the defined area use to connect to said conference call, the shared channel conference call having a first priority;
   (b) a retrieval device to retrieve a list of mobile station subscribers; and
   (c) a second call set-up device to initiate set up of an individual channel call to a member of said stored subscriber mobile station number list, the individual channel call using an individual channel to which an individual subscriber mobile station connects, to connect to said conference call, the individual channel call having a second priority which is lower than the first priority;

such that when the conference call is initiated a mobile station for a subscriber within said defined area is connected to said conference call using said shared channel as the shared channel call has a higher priority than that of the individual channel call, and a subscriber mobile station outside said defined area is connected to said conference call using an individual channel.

11. A computer program product including a computer readable medium carrier having computer executable code stored therein to enable a network device to perform the steps of:
   (a) initiating set up of a shared channel within a defined area, the shared channel being a channel that a plurality of the subscriber mobile stations in the defined area use to connect to said conference call, the shared channel call having a first priority;
   (b) retrieving a subscriber mobile station number list; and
   (c) initiating set up of an individual channel call to a member of the stored subscriber mobile station number list, the individual channel call using an individual channel to which an individual subscriber mobile station connects, to connect to said conference call, the individual channel call having a second priority which is lower than the first priority;

such that when the conference call is initiated a mobile station subscriber within said defined area is connected to said conference call using said shared channel as the shared channel call has a higher priority than that of the individual channel call, and a subscriber mobile station outside said defined area is connected to said conference call using an individual channel.

12. A method of setting up a conference call according to claim 1 wherein the shared channel is a half duplex connection.

13. A method of setting up a conference call according to claim 1 wherein the shared channel is a duplex connection.

* * * * *